(12) United States Patent
Thomas et al.

(10) Patent No.: US 12,416,338 B2
(45) Date of Patent: Sep. 16, 2025

(54) ACTUATION MECHANISM FOR COUPLING DEVICE

(71) Applicant: Means Industries, Inc., Saginaw, MI (US)

(72) Inventors: Steven M Thomas, Saginaw, MI (US); Joshua D Hand, Midland, MI (US); Spencer Kane, Chesaning, MI (US); Ali Merat, Fenton, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/574,163

(22) PCT Filed: Dec. 8, 2022

(86) PCT No.: PCT/US2022/052220
§ 371 (c)(1),
(2) Date: Dec. 26, 2023

(87) PCT Pub. No.: WO2023/107600
PCT Pub. Date: Jun. 15, 2023

(65) Prior Publication Data
US 2024/0318694 A1 Sep. 26, 2024

Related U.S. Application Data

(60) Provisional application No. 63/287,320, filed on Dec. 8, 2021.

(51) Int. Cl.
*F16D 41/12* (2006.01)
*F16D 11/14* (2006.01)
*F16D 23/12* (2006.01)

(52) U.S. Cl.
CPC ............ *F16D 41/125* (2013.01); *F16D 11/14* (2013.01); *F16D 2023/123* (2013.01)

(58) Field of Classification Search
CPC .. F16D 41/125; F16D 11/14; F16D 2023/123; F16D 27/06; F16D 27/108; F16D 27/118
See application file for complete search history.

(56) References Cited

U.S. PATENT DOCUMENTS

| 6,193,038 B1 | 2/2001 | Scott et al. |
| 9,546,696 B2 | 1/2017 | Oram et al. |

(Continued)

FOREIGN PATENT DOCUMENTS

| CN | 107776825 A | 3/2018 |
| DE | 102105207435 A1 | 11/2015 |

(Continued)

OTHER PUBLICATIONS

PCT/US2022/052220, Search Report, May 2, 2023.
PCT/US2022/052220, Written Opinion, May 2, 2023.
PCT/US2022/052220, Search Strategy, May 2, 2023.

*Primary Examiner* — Farhana Pervin
(74) *Attorney, Agent, or Firm* — Burgess Law Office, PLLC

(57) ABSTRACT

An actuation mechanism for use with a coupling device. The actuation mechanism includes an assembly having a hub, a latch member, a translating member, and an indexer. The assembly includes a carrier supported on the hub that engages the indexer. The carrier moves axially relative to the hub. A return member biasing the indexer to a non-deployed position, with the translating member acting against the return member to move the indexer to the deployed position.

19 Claims, 17 Drawing Sheets

(56) References Cited

U.S. PATENT DOCUMENTS

| | | | |
|---|---|---|---|
| 10,118,486 B2 | 11/2018 | Oram et al. | |
| 2015/0380144 A1* | 12/2015 | Heravi | H01F 7/081 |
| | | | 335/229 |
| 2016/0017932 A1 | 1/2016 | Gilmore | |
| 2017/0352463 A1* | 12/2017 | Heravi | H01F 7/18 |
| 2017/0356504 A1* | 12/2017 | Heravi | F16D 48/064 |
| 2020/0173500 A1 | 6/2020 | Yoder et al. | |
| 2020/0217374 A1* | 7/2020 | Hedge | F16D 43/2024 |

FOREIGN PATENT DOCUMENTS

| | | |
|---|---|---|
| DE | 112015000903 T5 | 7/2016 |
| DE | 102006009058 A1 | 9/2016 |
| DE | 102019131387 A1 | 6/2020 |

\* cited by examiner

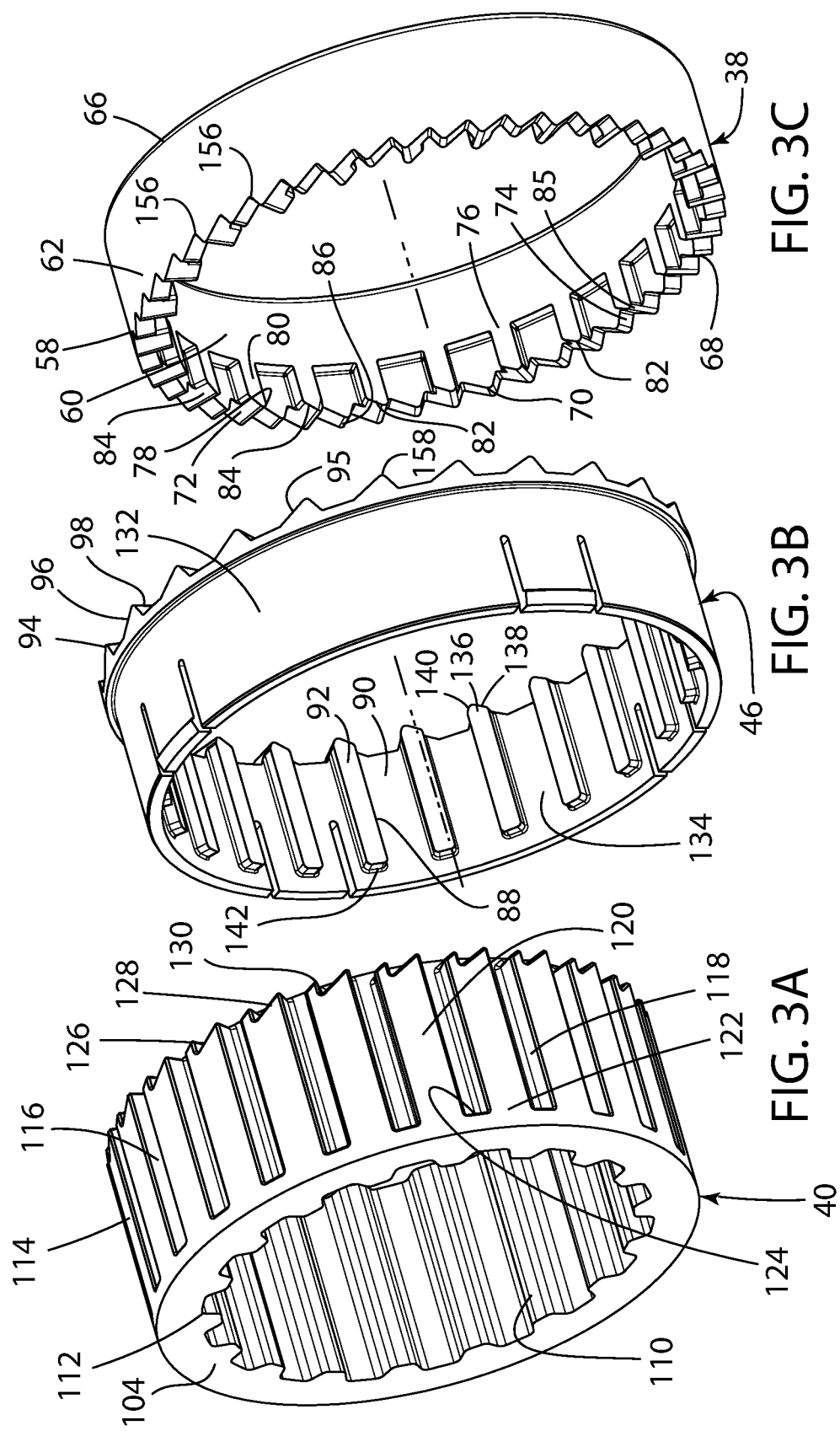

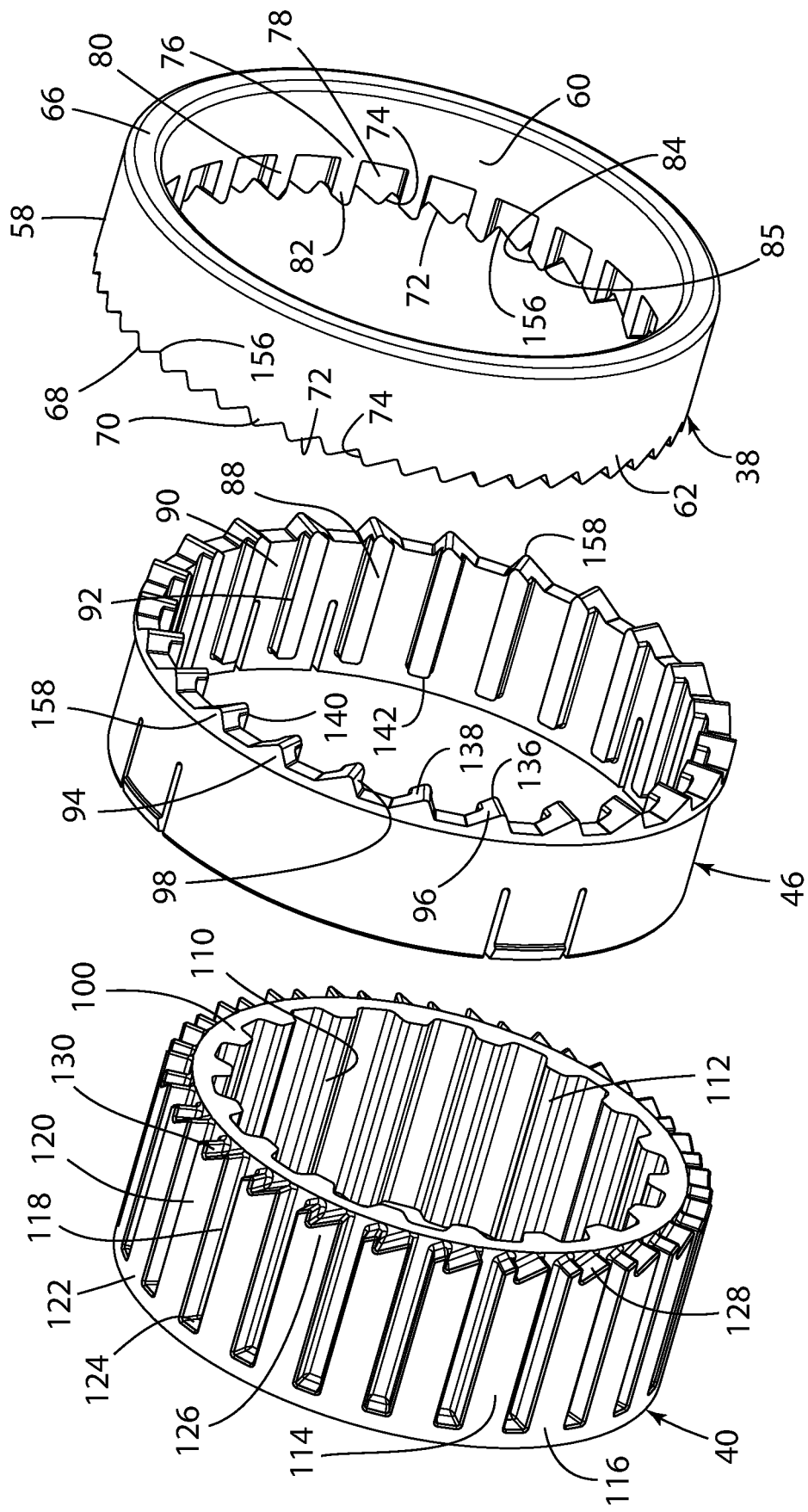

ACTUATION MECHANISM FOR COUPLING DEVICE

CROSS-REFERENCE TO RELATED APPLICATIONS

This application is a National Stage of International Application No. PCT/US2022/052220, filed Dec. 8, 2022, and claims the benefit of U.S. Provisional Application No. 63/287,320, filed Dec. 8, 2021. The disclosure of the above applications is incorporated herein by reference.

BACKGROUND OF THE INVENTION

1. Field of the Invention

The invention generally relates to an actuation mechanism and, more specifically, an actuator mechanism for use with a coupling device such as a one-way clutch or brake.

2. Description of Related Art

One-way clutches, or brakes, may include a strut or coupling member movable to an engaged/locked position. An actuator or actuation mechanism may control the strut or coupling member movement and move it to the engaged/locked position.

SUMMARY OF THE INVENTION

An assembly including a hub. The hub includes a hub having a rotational axis. The assembly may also include a latch member, the latch member is rotatably and axially fixed to the hub, a translating member including an annular translator attached to an outer circumferential surface thereof, the translating member supported on the latch member, the translating member is rotatably fixed and axially movable relative to the rotational axis and an indexer supported on the hub, the indexer rotatably and axially movable relative to the rotational axis. A carrier supported on the hub engages the indexer. The carrier is rotatably fixed and axially movable for axial motion with no rotation relative to the hub. A return member moves the indexer to a non-deployed position, with the translating member acting against the return member to move the indexer to the deployed position.

Further areas of applicability of the present invention will become apparent from the detailed description provided. It should be understood that the detailed description and specific examples, while indicating the preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein:

FIG. 3A is an enlarged view of the latch or stop member of the actuation mechanism of FIG. 3.

FIG. 3B is an enlarged view of the translating member of the actuation mechanism of FIG. 3.

FIG. 3C is an enlarged view of the indexer of the actuation mechanism of FIG. 3.

FIG. 4A is an enlarged view of the latch or stop member of the actuation mechanism of FIG. 4.

FIG. 4B is an enlarged view of the translating member of the actuation mechanism of FIG. 4.

FIG. 4C is an enlarged view of the indexer of the actuation mechanism of FIG. 4.

DETAILED DESCRIPTION OF THE PREFERRED EMBODIMENTS

Figure 1:
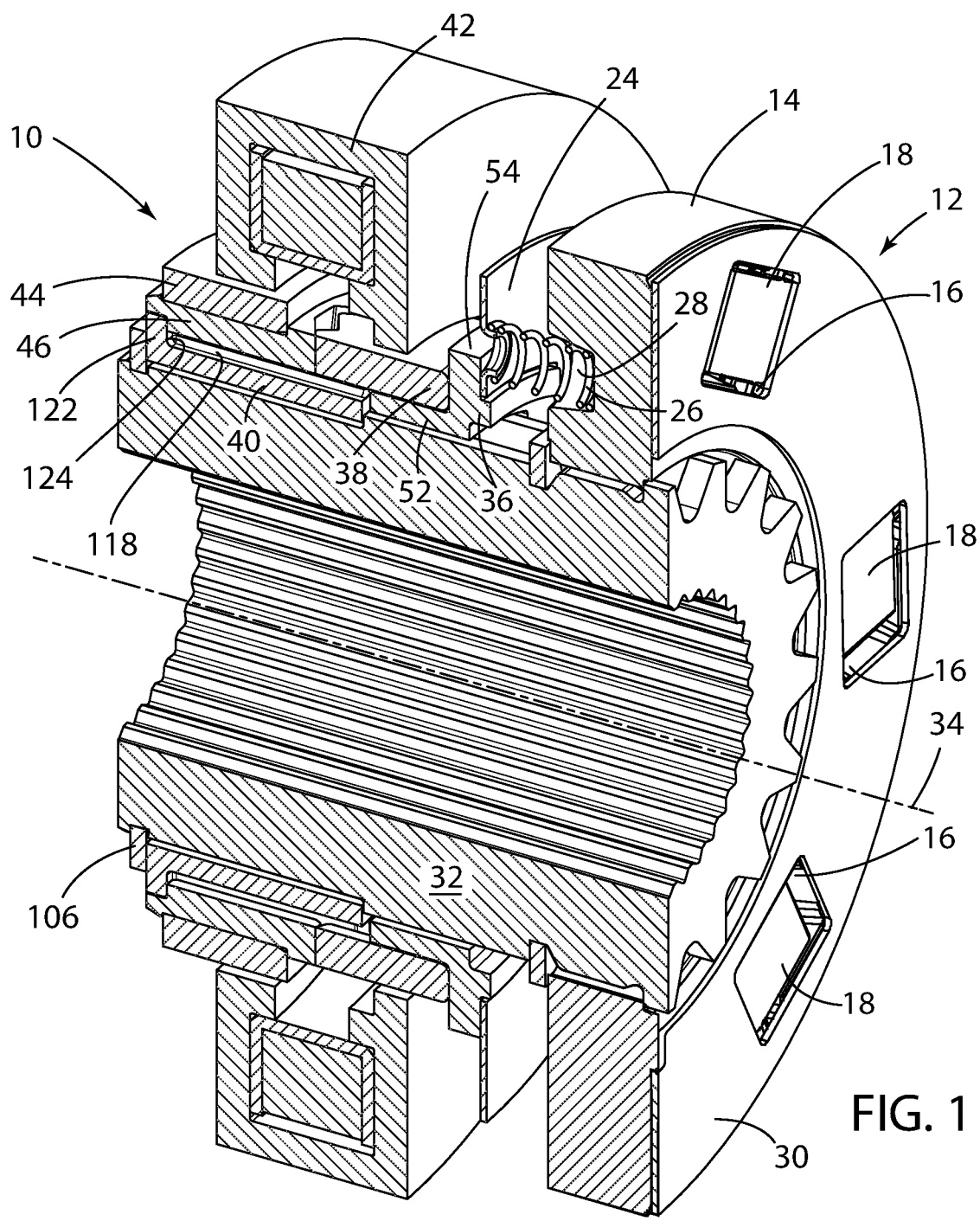
FIG. 1 is a schematic, cross-sectional perspective view of an actuation mechanism for use with a coupling device viewed from the right.
Figure 2:
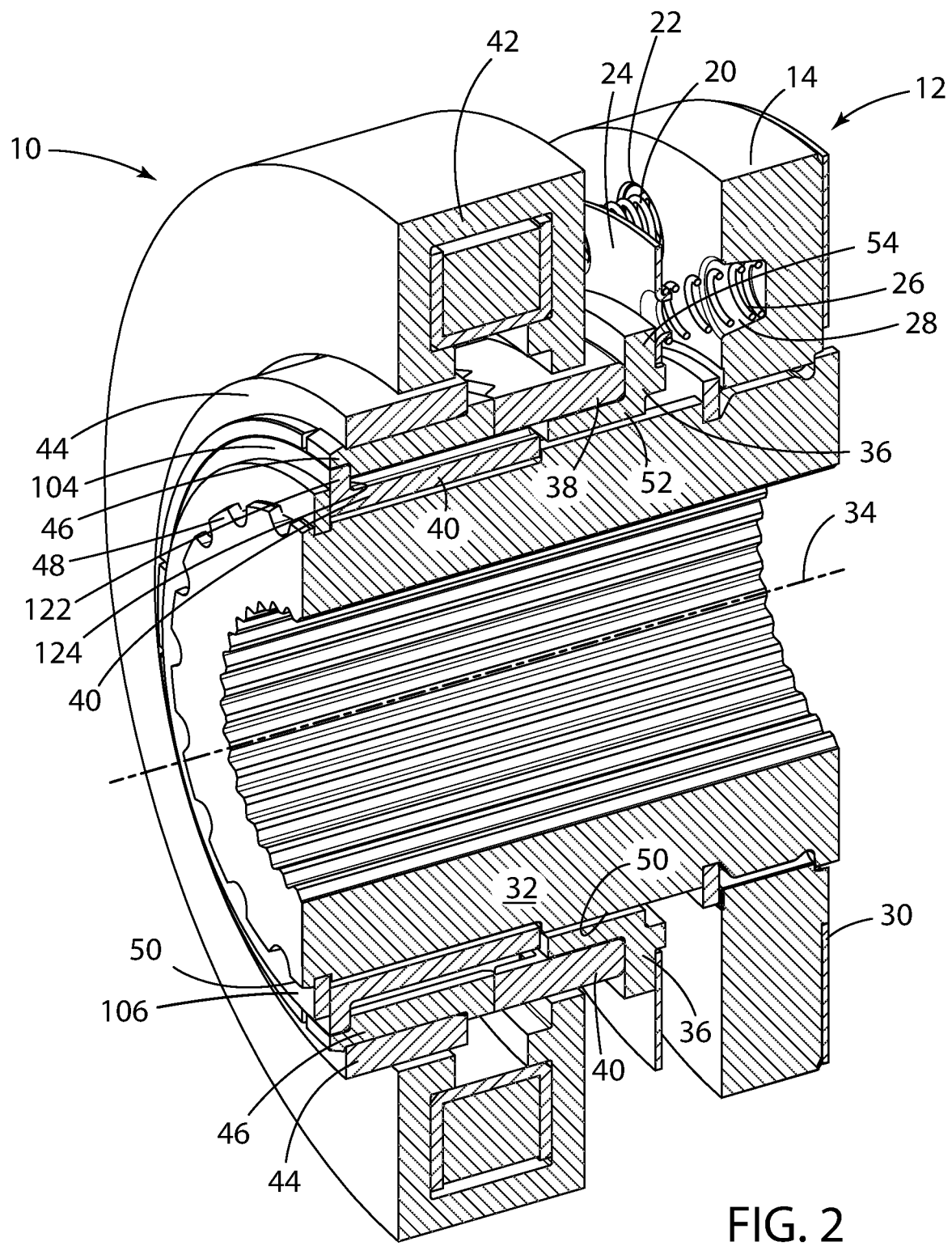
FIG. 2 is a schematic, cross-sectional perspective view of the actuation mechanism of FIG. 1 viewed from the left.
Figure 3:
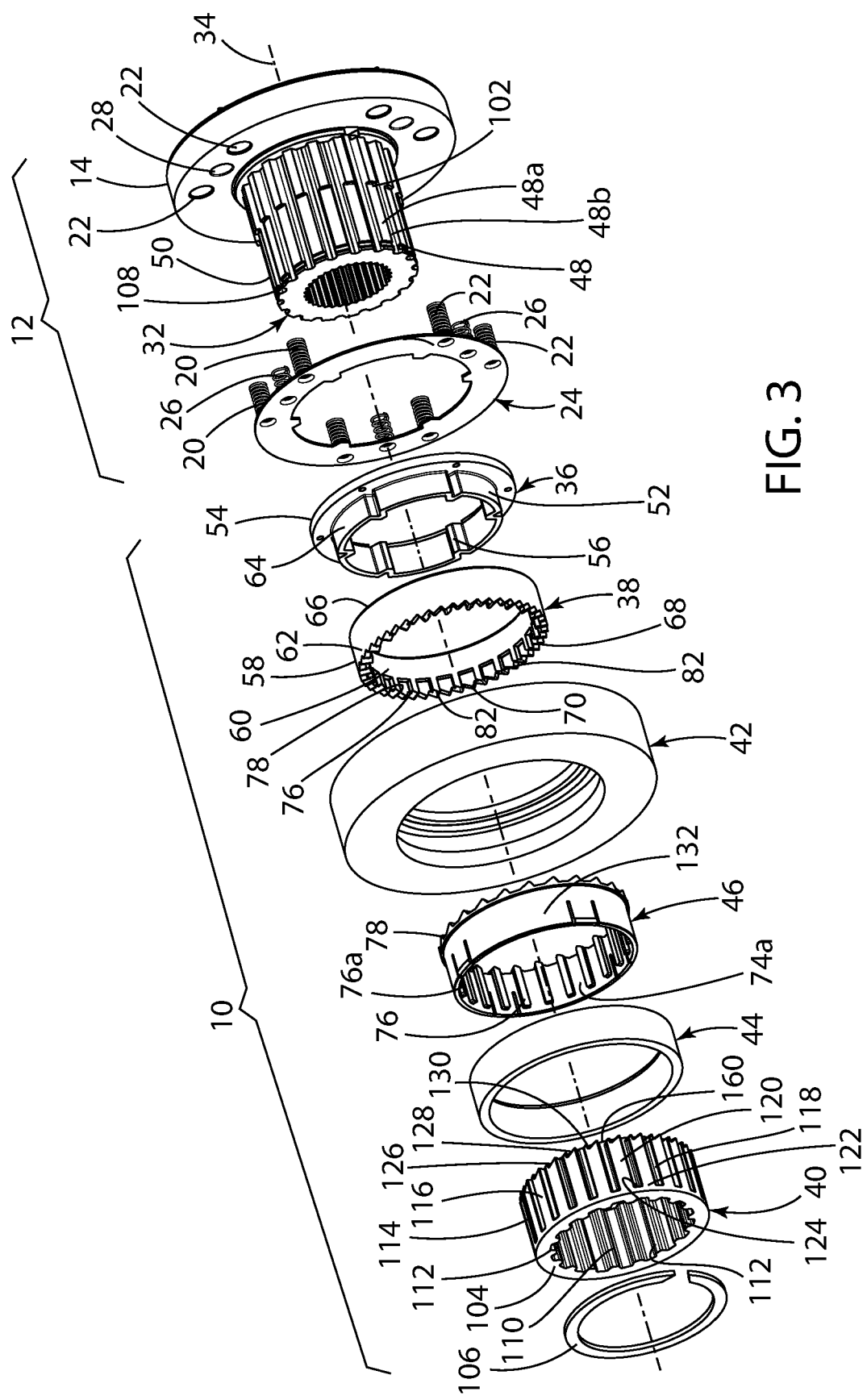
FIG. 3 is a schematic, partially exploded, perspective view of the actuation mechanism of FIG. 1 viewed from the left.

The following description of the preferred embodiment(s) is merely exemplary in nature and is not intended to limit the invention, its application, or its uses.

Examples of the present invention are disclosed herein; however, it is to be understood that the disclosed embodiments are merely exemplary of the invention that may be embodied in various and alternative forms. The figures are not necessarily to scale; some features may be exaggerated or minimized to show details of the components. Therefore, specific structural and functional details disclosed herein are not to be interpreted as limiting but merely as a representative basis for teaching one skilled in the art to variously employ the present invention.

FIGS. 1-4 illustrate a first example of an actuation mechanism, generally seen at 10, and a coupling device, generally seen at 12. One example of the coupling device 12 is a controllable clutch including an annular member, sometimes referred to as a pocket plate 14, having a recess or pocket 16 in a face or side surface 15 of the pocket plate 14 . . . . As used herein, the term "clutch" should be interpreted to include clutches or brakes wherein one plate is drivably connected to a torque delivery element of a transmission, and the other plate is drivably connected to another torque delivery element or is anchored and held stationary to a housing. The terms "coupling," "clutch," and "brake" may be used interchangeably.

A drive member or biasing member, shown herein as a spring 20, outwardly biases a locking element, shown as a strut 18, pivotally mounted in the recess or pocket 16 in the pocket plate. The biasing member or spring 20 extends through an aperture 22 in the pocket plate 14. One end of the biasing member or spring 20 engages an end of the strut 18, and the opposite end engages a spring plate 24. The actuation mechanism 10 controls the movement of the strut 18. The actuation mechanism 10 moves the spring plate 24 and biasing member or spring 20 linearly toward the pocket plate 14 from a clutch "off" position to a clutch "on" position wherein in the clutch "on" position, shown in FIG. 1, the strut 18 moves outwardly past the recess or pocket 16. The clutch "off" position and clutch "on" position may also be referred to as a non-deployed position, clutch "off" and a deployed position, clutch "on." For example, the strut 18, located in the pocket plate 14 moves between a between a non-deployed position—the strut 18 located in the pocket 16 and a deployed position—the strut 18 extending outwardly from the pocket 16 and beyond or past the face or side surface 15 of the pocket plate 14.

A return member, shown as a spring 26, extends between a bore 28 in the pocket plate 14 and the spring plate 24. The return member or spring 26 biases the pocket plate 14 and the spring plate 24 apart by moving the spring plate 24 away from the pocket plate 14.

The coupling device 12 may include a cover or selector plate 30 positioned adjacent the face or side surface 15 of the pocket plate 14.

Instead of the drive or biasing member being a coiled spring 20, the spring plate 24 can be operatively connected to other types of strut actuators, such as pins, which linearly move the struts 18 outwardly of the recess or pocket 16 and past the face or side surface 15 of the pocket plate 14.

One example of the actuation mechanism 10 includes an elongated, cylindrical hub 32, extending along and rotating about a longitudinal axis 34, a spring plate carrier 36, an indexer 38, a latch or stop member 40, a stator 42, a translator 44, and a translating member 46. Depending upon the relative positions of the indexer 38 and latch or stop member 40, the actuation mechanism 10 moves between an initial or retracted position and a subsequent or extended position. The return member or spring 26 operates to bias or urge the actuation mechanism 10 to the initial or retracted position.

The hub 32 includes a plurality of elongated splines 48 extending longitudinally along an outer circumferential surface 50 of the hub 32. The splines 48 are a plurality of radially extending projections 48a, external splines, separated by grooves 48b, internal splines, formed longitudinally around the outer circumferential surface 50 of the hub 32. The splines 48 fit into corresponding grooves, internal splines, and projections, external splines in a mating part.

The spring plate carrier 36 includes a cylindrical body 52 and a radially outwardly extending flange 54. The cylindrical body 52 of the spring plate carrier 36 has radially inwardly extending splines 56. The splines 56 mate with the grooves 48b of the splines 48 on the outer circumferential surface 50 of the hub 32. The cylindrical body 52 is positioned and sliding longitudinally on the outer circumferential surface 50 of the hub 32. The corresponding splines 48, 56 prevent relative rotation between the spring plate carrier 36 and the hub 32. The splined connection between the spring plate carrier 36 and hub 32 permits reciprocal axial movement of the spring plate carrier 36 along the hub 32 in the direction of the longitudinal axis 34. The radially outwardly extending flange 54 of the spring plate carrier 36 engages the spring plate 24, wherein longitudinal movement of the spring plate carrier 36 correspondingly moves the spring plate 24. In an alternative embodiment, the spring plate 24 and the carrier 36 can be an integral or unitary member.

The indexer 38 has a cylindrical body 58 having an inner circumferential surface 60 and an outer circumferential surface 62. The cylindrical body 58 of the indexer 38 is positioned over the cylindrical body 52 of the spring plate carrier 36; specifically, the inner circumferential surface 60 of the cylindrical body 58 of the indexer 38 is located adjacent to an outer circumferential surface 64 of the cylindrical body 52 of the spring plate carrier 36. One end 66 of the indexer 38 engages the radially outwardly extending flange 54 of the spring plate carrier 36. The opposite end 68 of the indexer 38 includes a plurality of longitudinally extending first or outer cam members 70 disposed circumferentially about the opposite end 68 in a saw-tooth configuration—each outer cam member 70 having a cam surface or ramp 72 and a cam displacement surface 74. The first or outer cam members 70 are adjacent to the outer circumferential surface 62 of the indexer 38. The indexer 38 moves through incremental positions and cooperates with other components of the actuation mechanism 10 to locate or place the actuation mechanism in either an "on" or "off" position.

The inner circumferential surface 60 of the indexer 38 includes a plurality of splines 76 formed of longitudinally extending grooves/guides 78 and projections or fingers 80. The projections or fingers 80 extending to the end 68 of the indexer 38. The projections or fingers 80 forming second or inner longitudinally extending cam members 82 disposed circumferentially about the opposite end 68. The second cam members 82 are adjacent to the inner circumferential surface 60 of the indexer 38. Each finger 80 includes a cam surface or ramp 84, extending at the same angle and in common with the cam surface or ramp 72 of the outer cam members 70. The groove or guide 78 terminates or ends the cam surface or ramp 84 of the projection or finger 80 before the cam surface or ramp 84 reaches the vertex 86 of a first or outer cam member 70, the vertex being the intersection of the cam surface or ramp 72 and the cam displacement surface 74.

The indexer 38 rotates about the hub 32 and the spring plate carrier 36 and slides axially to both. As shown in FIGS. 5-9, the indexer 38 rotates circumferentially in the direction of the arrow 152. The indexer 38 also moves reciprocally, in an axial direction, in the direction of arrows 150, 160, along the longitudinal axis 34 of the hub 32 of the actuator mechanism 10.

The translating member 46 includes a plurality of longitudinally extending first or outer cam members 94 disposed circumferentially about one end 95 of the translating member 46 in a saw-tooth configuration—each cam member 94 having a cam surface or ramp 96 and a cam displacement surface 98. The first or outer cam members 94 are adjacent to the outer circumferential surface 132 of the translating member 46.

An inner circumferential surface 134 of the translating member 46 includes a plurality of splines 88 formed of longitudinally extending grooves or guides 90 and projections or fingers 92. The projections or fingers 92 extend longitudinally from the end 95 of the translating member 46. The ends of the projections or fingers 92 form second or inner cam members 136, which are adjacent to the first or outer cam members 94. The second or inner cam members 136 include cam surfaces or ramps 138 and cam displacement surfaces 140. Similar to the respective cam surfaces or ramps 72, 84 of the outer and inner cam members 70, 82, the respective cam surfaces or ramps 138 of the inner cam members 136 of the translating member 46 extend at the same angle and in common with the cam surface or ramps 96 of the first or outer cam members 94.

While at the same angle and in common, the respective cam surfaces or ramps of both sets of outer cam members 70, 82 and 94, 136 could have different angles and lie at different circumferential positions, for example, spaced apart.

The first or outer members 94, and corresponding cam surfaces or ramps 96 and cam displacement surfaces 98, of the translating member 46 cooperate and work with the corresponding or complementary first or outer cam members 70, and corresponding cam surfaces or ramps 72 and cam displacement surfaces 74, of the indexer 38. While the second or inner cam members 136, and corresponding cam surfaces or ramps 138 and cam displacement surfaces 140, of the translating member 46 cooperate and work with the corresponding or complementary second or inner cam members 82, and corresponding cam surfaces or ramps 84 and cam displacement surfaces 85, of the indexer 38.

The latch or stop member 40 is fixed to the hub 32. As shown in FIG. 1, a longitudinal end 100 of the latch or stop member 40 engages a shoulder 102 on the hub 32. The opposite longitudinal end 104 of the latch or stop member 40 is held stationary on the hub 32 by a snap ring 106 in a circumferential groove 108 in the hub 32. An inner circumferential surface 110 of the latch or stop member 40 includes splines 112 engaging the splines 48 of the hub 32 to prevent rotation of the latch or stop member 40 with respect to the hub 32. An outer circumferential surface 114 of the latch or stop member 40 includes a plurality of longitudinally extending splines 116 formed of longitudinally extending grooves or guides 118 and projections or fingers 120. The end 104, adjacent to the snap ring 106, has an annular portion 122 forming an end wall or surface 124 of the grooves or guides 118.

The latch or stop member 40 includes a plurality of longitudinally extending cam members 126 disposed circumferentially at the ends of the projections or fingers 120 near the end 100 of the latch or stop member 40 contacting the shoulder 102 of the hub 32. Each cam member 126 of the latch or stop member 40 includes a cam surface or ramp 128 and a cam displacement surface 130. The cam members 126 have a saw-tooth configuration.

The cam surface or ramp 128 is complementary to and has the same angle as the cam surface or ramp 84 of the second cam 82 of the indexer 38. The cam displacement surface 130 is complementary to and has the same angle as the cam displacement surface 85 of the indexer 38.

Figure 4:
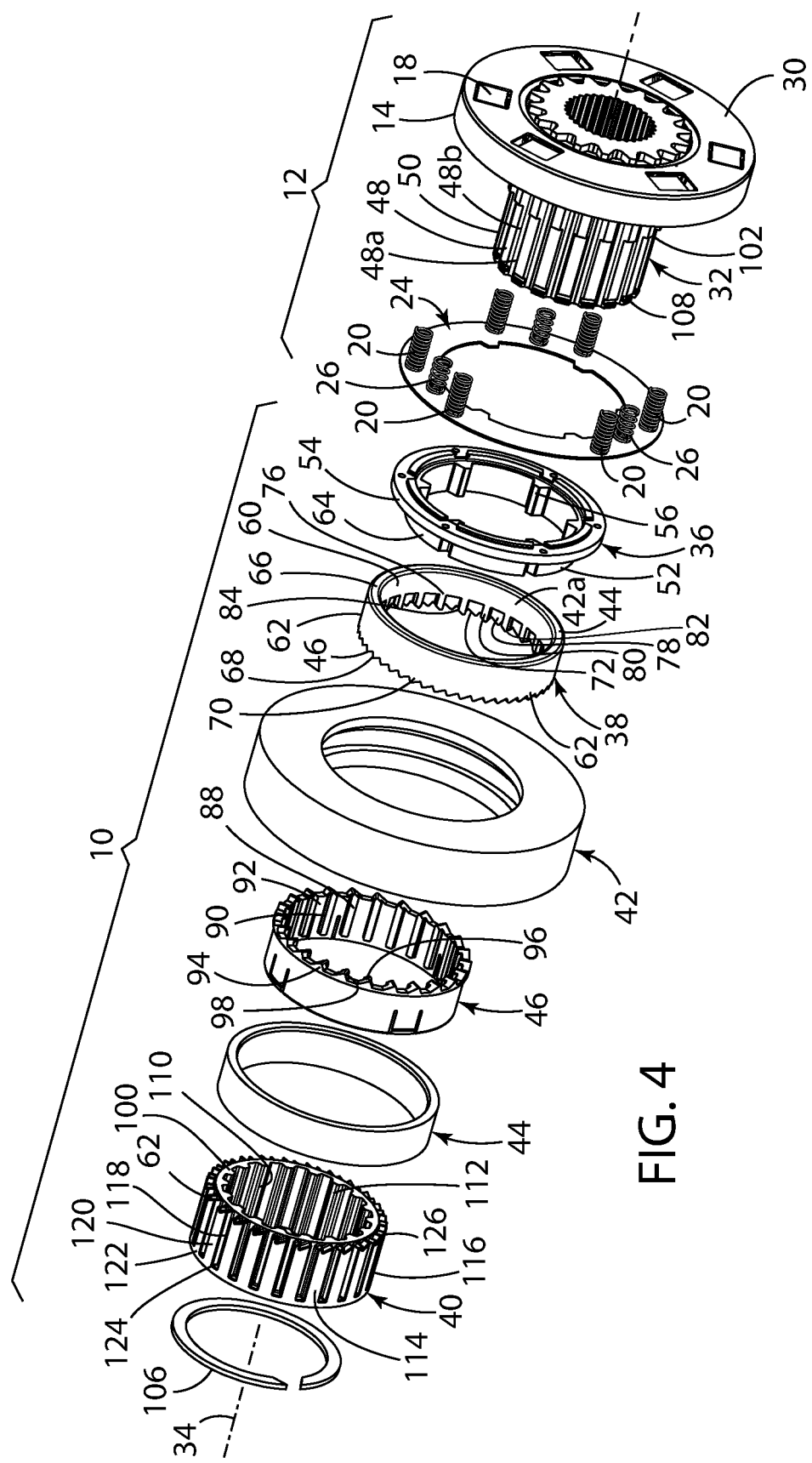
FIG. 4 is a schematic, partially exploded, perspective view of the actuation mechanism of FIG. 1 viewed from the right.

The grooves or guides 118 on the outer circumferential surface 114 of the latch or stop member 40 have the same circumferential width as the circumferential width of each longitudinally extending projection or finger 80 of the indexer 38. As illustrated in FIG. 4, the longitudinally extending projections or fingers 80 of the indexer 38 slide axially in the grooves or guides 118 of the latch or stop member 40.

In addition to cooperating with the inner cam members 136 of the translating member 46, the second or inner cam members 82 of the indexer 38 also cooperate with the cam members 126 of the latch or stop member 40.

The stator 42 provides a magnetic field that acts on the translator 44, in the present example, a steel ring. Electric current applied to the stator 42 creates a magnetic field that acts on and moves the translator 44. Because the translator 44 is attached to the translating member 46, secured to the outer circumferential surface 132 thereof, movement of the translator 44, caused by the stator 42, results in movement of the translator 44 and translating member 46 combination. The projections or fingers 92 on the inner circumferential surface 132 of the translating member 46 engage the grooves or guides 118 of the latch or stop member 40. The translating member 46 and translator 44 move axially along the latch or stop member 40 in the direction of the longitudinal axis 34 but do not rotate about the latch or stop member 40. The translatory or sliding motion of the translating member 46 on the latch or stop member 40 is similar to that of a plunger moving back and forth in a reciprocal motion.

As the translating member 46 moves longitudinally in the direction of the longitudinal axis 34, the cam surfaces or ramps 96 and cam displacement surfaces 98 of the cam members 94 of the translating member 46 interact with corresponding cam surfaces or ramps 72 and cam displacement surfaces 74 of the outer cam members 70 of the indexer 38 to both axially move and rotate the indexer 38.

The actuation mechanism 10 moves the coupling device 12 between an "off" position and an "on" position. In the "on" position, the actuation mechanism 10 extends and moves the spring plate carrier 36 and spring plate 24 combination closer to the pocket plate 14, wherein the springs 20 act on the struts 18. In the "off" position, the actuation mechanism 10 retracts, moves to the initial position, enabling the spring plate carrier 36 and spring plate 24 combination to be spaced further from the pocket plate 14. The "on" and "off" positions of the coupling device 12 can be established by the location of, or the relative engagement of, the indexer 38 and the latch or stop member 40.

Figure 5:
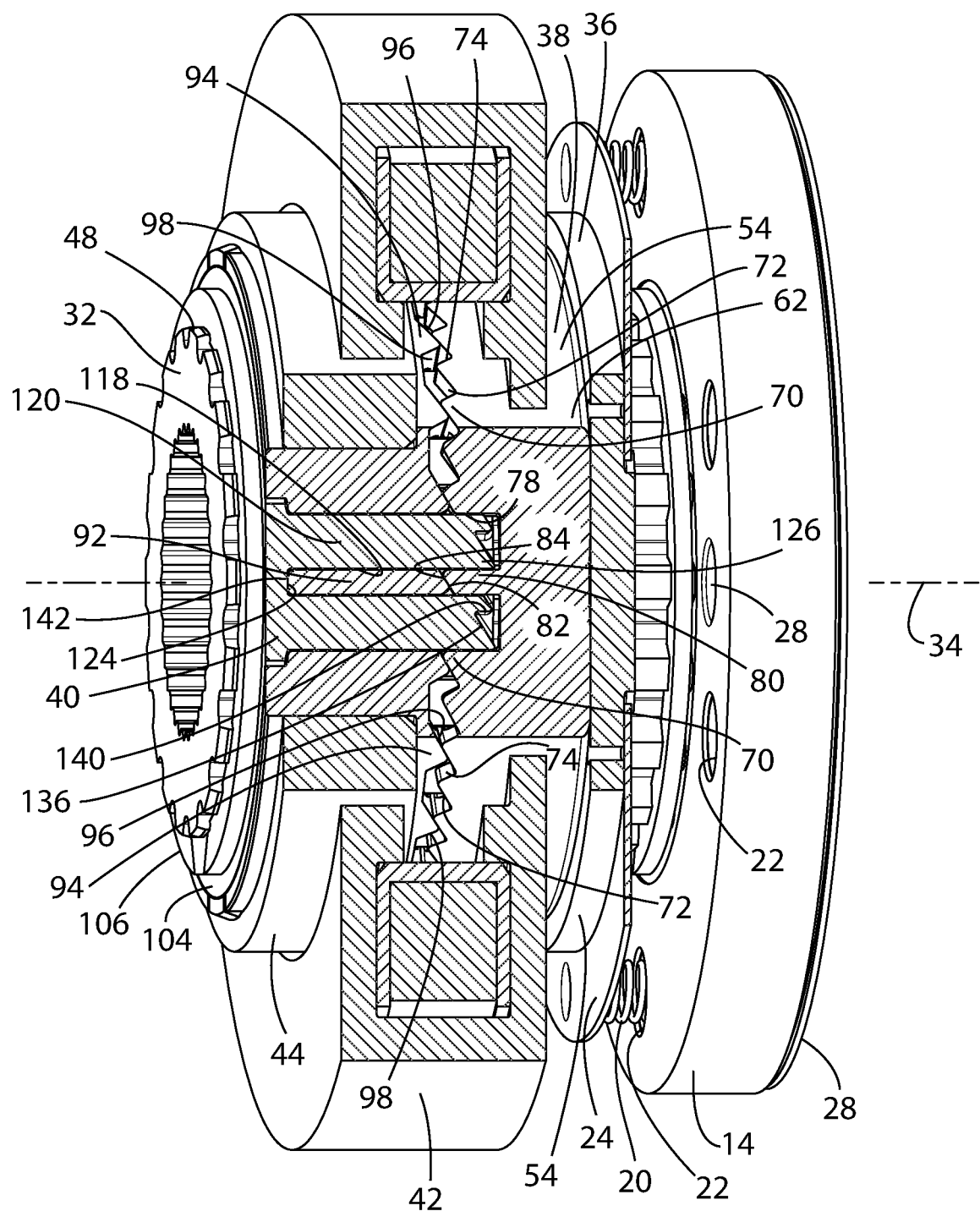
FIG. 5 is a schematic, sectional, perspective view of the actuation mechanism of FIG. 1.
Figure 6:
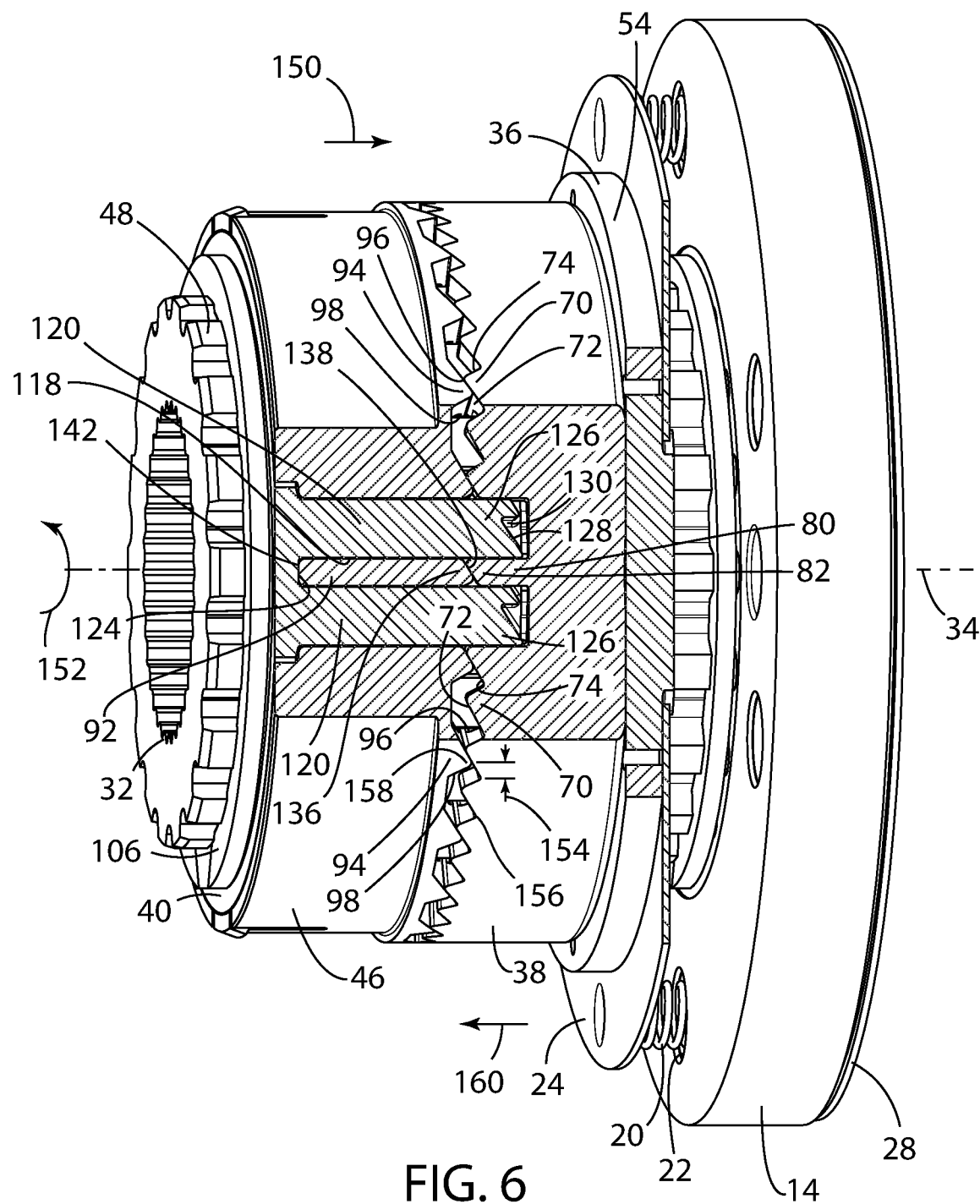
FIG. 6 is a schematic, sectional, perspective view, with portions removed illustrating the actuation mechanism of FIG. 1 in a non-deployed position.

FIGS. 5-6 illustrate the actuation mechanism 10 in a retracted position placing the coupling device 12 in the "off" position, with the stator 42 and translator 44 removed for clarity in FIGS. 6-9. The retracted position occurs when the cam surface or ramp 84 and projection or finger 80 of the indexer 38 are positioned in the grooves or guides 118 of the latch or stop member 40, with the projections or fingers 120 and corresponding cam members 126 of the latch or stop member 40 positioned in the grooves or guides 78 of the indexer 38 wherein the cam surface or ramp 84 of the projection or finger 80 contacts the cam surface or ramp 138 of the projection or finger 92 of the translating member 46. The force applied by the return members or springs 26 maintains engagement between the cam surface or ramp 84 of the projection or finger 80 of the indexer 38 and the cam surface or ramp 138 of the projection or finger 92 of the translating member 46, wherein the end 142 of the projection or finger 92 of the translating member 46 contacts and rests on the end wall or surface 124 of the groove or guide 118 of the latch or stop member 40.

The cam surface or ramp 72 of the first or outer cam member 70 of the indexer 38 contacts the cam surface or ramp 96 of an adjacent first or outer cam member 94 of the translating member 46. The respective cam surfaces or ramps 72, 96 are shown contacting one another approximately midway along the respective cam surfaces or ramps 72, 96. Because the stator 42 is not engaged, the first or outer cam members 94 of the translating member 46 apply no force to the indexer 38. Depending upon tolerances or design, there may be a slight gap or space between the respective cam surfaces or ramps 72, 96 when the stator 42 is off. When the stator 42 is off, the translating member 46, particularly the projection or finger 92, transfers the load from the spring plate carrier 36 through the indexer 38 to the latch or stop member 40. When the stator 42 is actuated, the translating member 46 applies force to the indexer 38 to move the indexer 38 axially, in the direction of the arrow 150, toward the pocket plate 14, enabling it to, due to interaction with the translating member 46 and the latch or stop member 40, rotate and position the coupling device 12 in one of the "on" or "off" positions.

Actuation of the stator 42 pulls the translating member 46 and translator 44 combination toward the stator 42 using electromagnetics. Pulling the translating member 46 and translator 44 combination toward the stator 42 moves the translating member 46 and translator 44 combination axially, in the direction of the arrow 150. The engagement configuration between the first or outer cam members 70 of the indexer 38 and the first or outer cam members 94 of the translating member 46 stays, as shown in FIG. 5, until the projections or fingers 80 and corresponding second or inner cam members 82, including the cam surfaces or ramps 84, pushed axially in the direction of the arrow 150 by the projections or fingers 92 of the translating member 46, clear the grooves or guides 118 between adjacent projections or fingers 120 of the latch or stop member 40.

Figure 7:
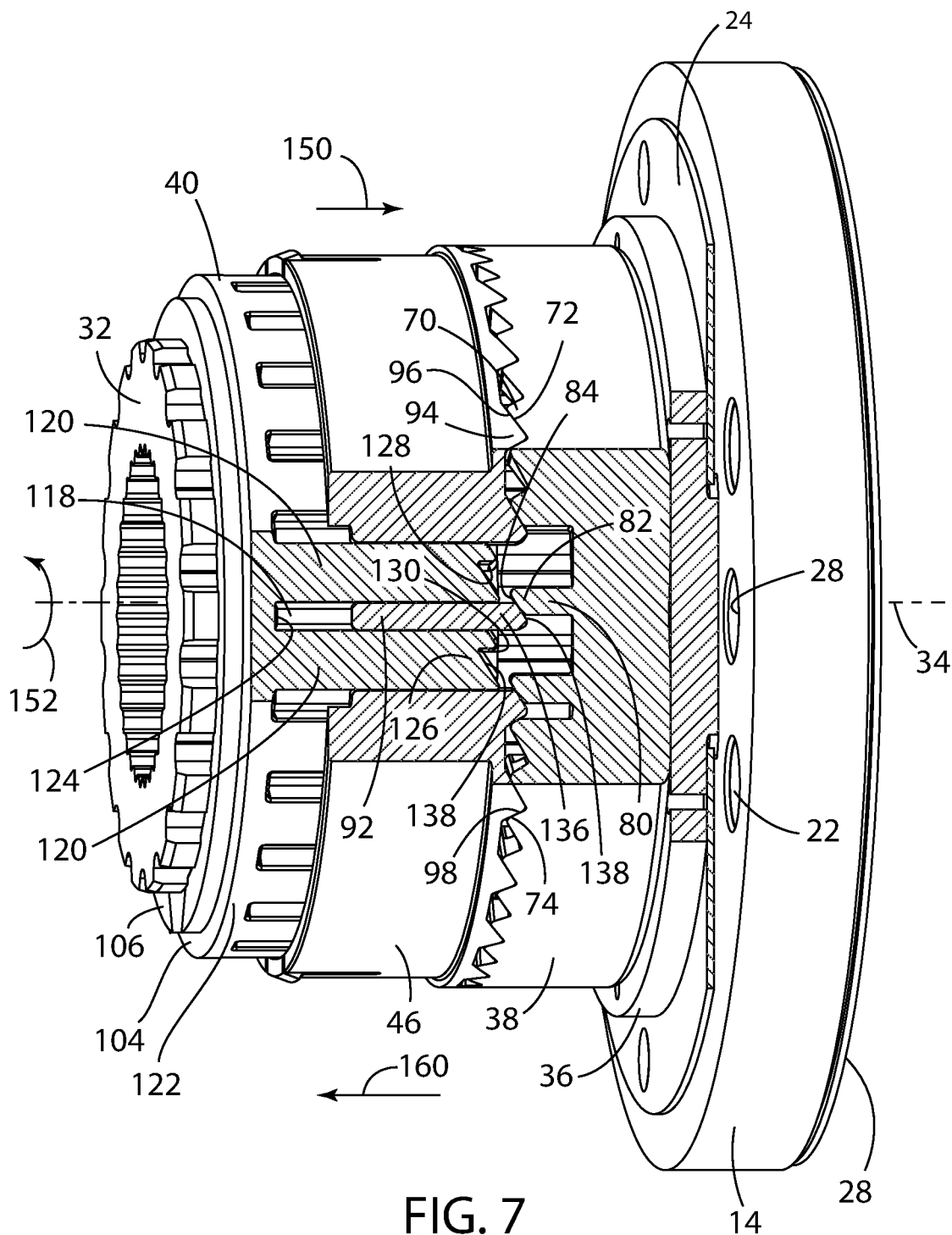
FIG. 7 is a schematic, sectional, perspective view, with portions removed illustrating the actuation mechanism of FIG. 1 moving from a non-deployed position.

FIG. 7 shows, once the projections or fingers 80 of the indexer 38 clear the grooves or guides 118 of the latch or stop member 40 the force applied by the return member or spring 26 acts, through the spring plate carrier 36, on the indexer 38 and correspondingly the adjacent cam surfaces or ramps 72, 96 of the indexer 38 and the translating member 46. The force, through the cam surface or ramps 72, 96, of the first or outer cam member 70 of the indexer 38 and adjacent first or outer cam member 94 of the translating member 46, rotates the indexer 38 in the direction shown by arrow 152. As the indexer 38 rotates to the position in FIG. 7, the cam surface or ramp 72 of the first or outer cam member 70 of the indexer 38 slides along the respective cam surface or ramp 96 of the first or outer cam member 94 of the translating member 46 until the cam displacement surfaces 74, 98 of the outer cam members 70, 94 engage or contact one another. Engagement of cam displacement surfaces 74, 98 stops rotation, movement in the direction of the arrow 152, of the indexer 38. The amount or degree of rotation is determined by the circumferential gap or space 154 between the apex 156 of first or outer cam member 70 of the indexer 38 and the vertex 158 of first or outer cam member 94 of the translating member 46. The indexer 38 rotates due to the axial force applied by the stator 42 to the translator 44 and translating member 46 acting against the return member or spring 26 and on the cam surfaces or ramps 72, 96. The cam surfaces or ramps 84, 138 of the second or inner cam members 82, 136 form complementary ramp surfaces on which the cam members 82, 136 slide. FIG. 7 shows the rotation of the indexer 38 stopped with the projection or finger 80 and corresponding cam surface or ramp 84 of the second or inner cam member 82 positioned slightly over, or above, the cam surface or ramp 138 of the projection or finger 92 of the second or inner cam member 136 of the translating member 46.

De-energizing the stator 42 removes the axial force applied by translator 44 on the translating member 46. FIG. 6 shows moving the translator 44 and the translating member 46 in the direction shown by the arrow 160, disengages the indexer 38 and translating member 46, wherein the outer cams 70, 94 separate from one another. The force provided by the return member or spring 26 slides the cam surface or ramp 84 of the second or inner cam 82 of the indexer 38 along the angled cam surface or ramp 128 of the cam member 126, rotating the indexer 38 in the direction of the arrow 152. The translating size, axial amount, or degree of the circumferential gap or space 154 between the indexer 38 and translating member 46 is shown for illustrative purposes only and may vary. The respective cam displacement surfaces 74, 85 are angled or inclined with respect to the longitudinal axis 34. As the indexer 38 rotates and moves, in the direction of the arrow 152, the angled or inclined cam displacement surface 74 acts on the corresponding angled or inclined cam displacement surface 98 to help move and allow movement of the translating member 46 in the direction of the arrow 160, away from the indexer 38.

Figure 8:
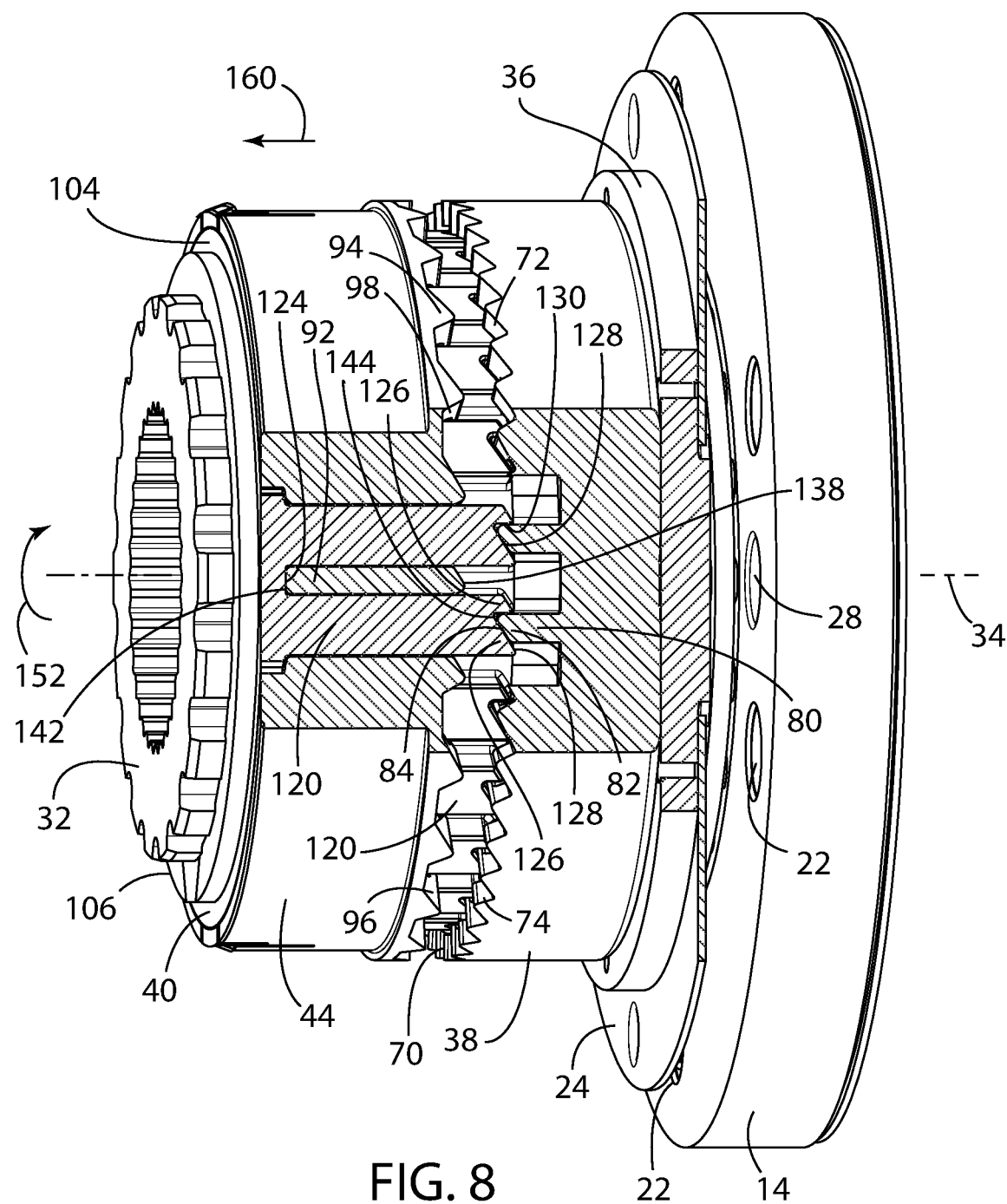
FIG. 8 is a schematic, sectional, perspective view, with portions removed illustrating the actuation mechanism of FIG. 1 in a deployed position.

The return member or spring 26 also moves the indexer 38 axially in the direction shown by arrow 160, wherein the cam surface or ramp 84 of the projection or finger 80 engages a corresponding angled cam surface or ramp 128 of the cam member 126 of the latch or stop member 40. Engagement of the cam surface or ramp 84 and the corresponding angled cam surface or ramp 128 rotates the indexer 38 in the direction of the arrow 152. Once again, the indexer 38 rotates in the direction of the arrow 152 due to the axial force applied by the return member or spring 26 and the angled cam surfaces or ramps 84, 128. Sliding or relative movement between the adjacent cam surfaces or ramps 84, 128 rotates the indexer 38 about the longitudinal axis 34 in the direction of arrow 152. As shown in FIG. 8, the projection or finger 80 of the indexer 38 now rests in the shallow notch 144 between adjacent cam surfaces or ramps 128 and cam displacement surfaces 130 placing the clutch in the "on" position.

Figure 9:
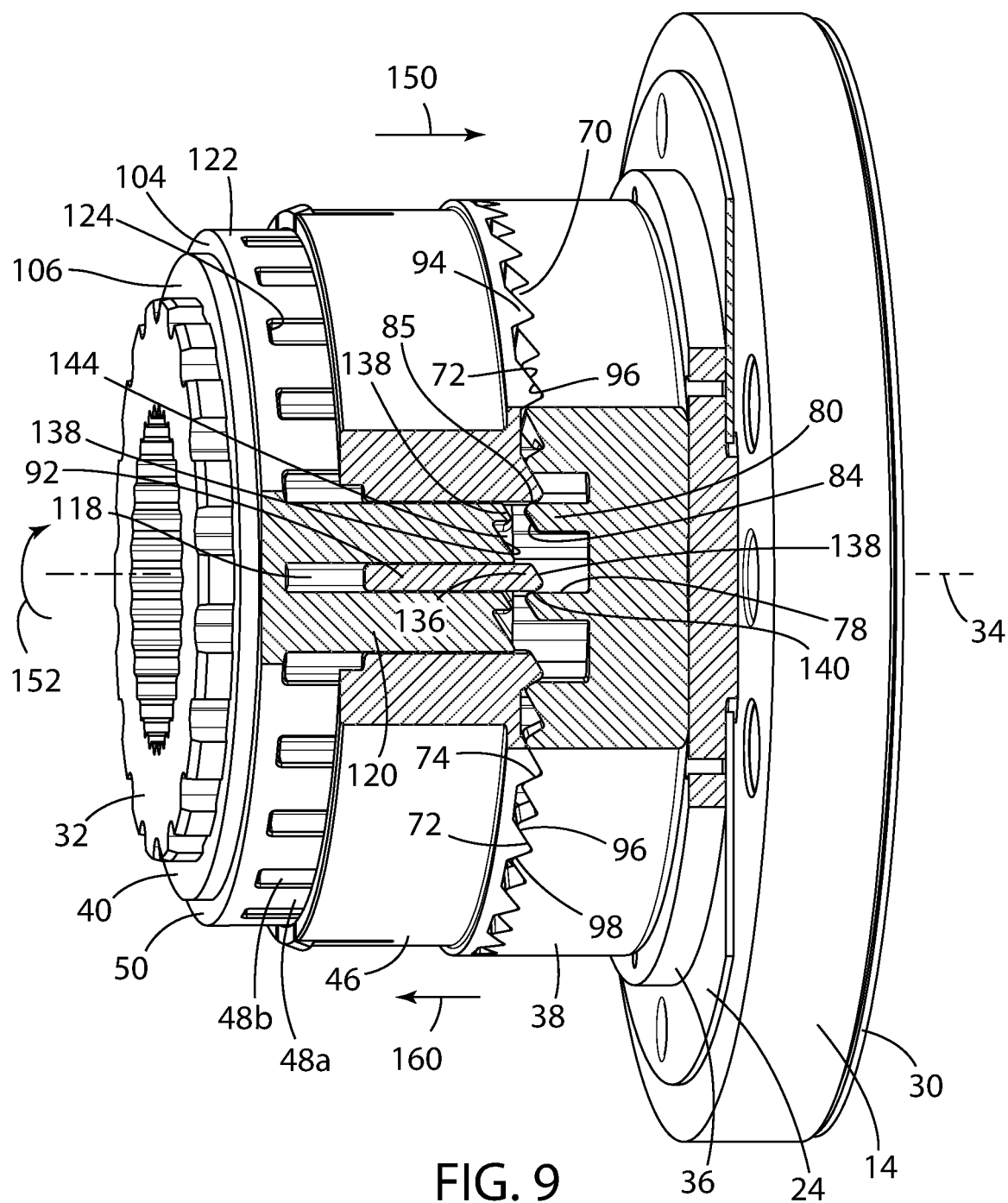
FIG. 9 is a schematic, sectional, perspective view, with portions removed illustrating the actuation mechanism of FIG. 1 moving from a deployed position.

Moving the clutch from the "on" position to the "off" position requires re-energizing the stator 42. Upon energizing the stator 42, the translator 44 and translating member 46 combination moves axially in the direction of arrow 150. The cam surfaces or ramps 72, 96 again engage one another. The translating member 46 acts against the return member or spring 26, moves the indexer 38 axially, and lifts the corresponding projections or fingers 80 of the indexer 38 out of the notch 144 formed between adjacent cam surfaces or ramps 128. Once the projections or fingers 80 are clear of the notch 144, the indexer 38 rotates in the direction of the arrow 152 until the cam displacement surface 85 of the second or inner cam member 82 of the translating member 46 engages the cam displacement surface 140 of the second or inner cam member 136 of the translating member 46, the respective sides of adjacent projections or fingers 80, 92 engage one another; see FIG. 9. In addition, the respective cam displacement surfaces 74, 98 engage one another. The cam surface or ramp 84 is positioned over the cam surface or ramp 128 adjacent to the groove or guide 118 in the latch or stop member 40. FIG. 9 shows the indexer 38 rotating approximately 3-5° to align the adjacent cam surfaces or ramps 84, 128. When the stator 42 is de-energized, the return member or spring 26 moves the indexer 38 in the direction of the arrow 160, wherein the cam surface or ramp 84 slides on the cam surface or ramp 128 and rotates the indexer 38 in the direction of the arrow 152. The rotation causes inclined or angled cam displacement surface 74 to slide up and over correspondingly inclined or angled cam displacement surface 98. Indexer 38 rotation continues until the projections or fingers 80 of the indexer 38 enter and slide in the grooves or guides 118—locating the projections or fingers 80 in the grooves/guides 118 places the actuation mechanism 10 and correspondingly the clutch in the "off" position, as illustrated in FIG. 6.

The rotation or amount of rotation of the indexer 38 is determined by the angle of the cam surfaces 72, 74, 84, 85, 96, 98, 138, 140, 128, and 130. Continued rotation of the indexer 38 continues the extend/retract cycle by repeating the same steps.

The foregoing disclosure incorporates using a plurality of different cams and indexers rotating about a longitudinal axis of a clutch shaft.

The forgoing provides an actuation mechanism requiring zero power while in state and in one direction of actuation regardless of traveling from "on" to "off" or "off" to "on." The forgoing works well in situations where the parts rotate-centrifugally neutral.

FIGS. 10-15 illustrates alternative examples of a mechanism for moving the translating member 46. For example, rather than using a stator 42, a double-sided shift fork, generally seen at 170-FIGS. 10-11; a single-sided shift fork, generally seen at 190-FIGS. 12-13; and a pneumatic piston, generally seen at 210-FIGS. 14-15 may also move the translating member 46. The foregoing are illustrative examples and do not limit the mechanisms that move the translating member 46.

Figure 10:
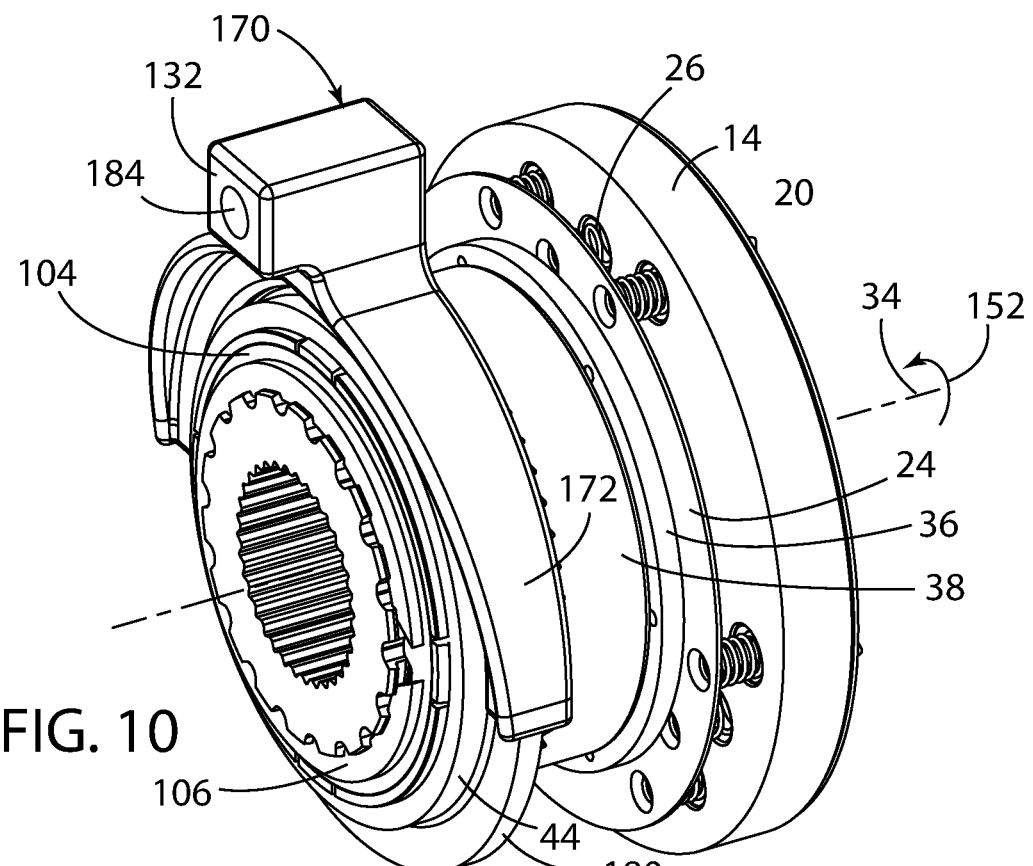
FIG. 10 is a perspective view of an additional embodiment of an actuation mechanism.
Figure 11:
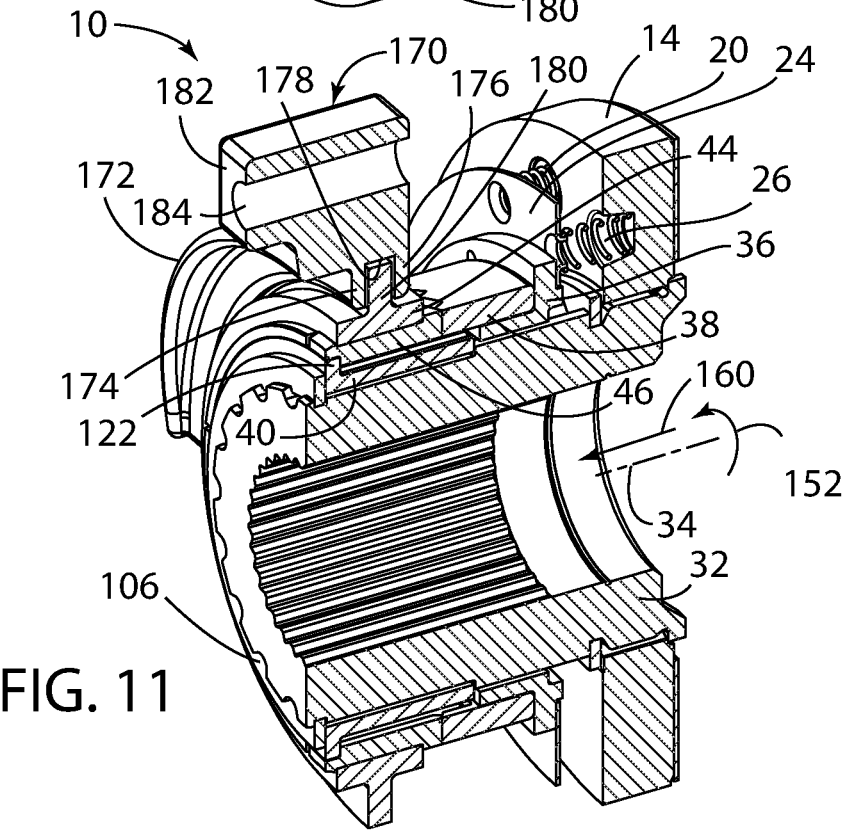
FIG. 11 is a cross-sectional perspective view of the actuation mechanism of FIG. 10.

FIGS. 10 and 11 show the double-sided shift fork 170 includes a C-shaped portion 172, including two radially inwardly extending flanges 174, 176 forming a notch 178. A radially outwardly extending flange 180 on the translating member 46 is in the notch 178. The double-sided shift fork 170 also includes a connection portion 182 having an aperture or bore 184 sized to receive a member (not shown) that moves the shift fork 170 reciprocally in the direction of the longitudinal axis 34. The double-sided shift fork 170 moves the translating member 46 between the corresponding "on" and "off" positions. Moving the translating member 46 rearwardly, toward the end 104 of the latch or stop member 40 in the direction of the arrow 160 pulls the translating member 46 rearwardly and disengages the respective cam members 70, 94 of the indexer 38 and translating member 46, whereby the return member or spring 26 moves the indexer 38 rearward in the direction of the arrow 160. The cam surface or ramp 72 slides on the cam surface or ramp 96, rotating the indexer 38 in the direction of the arrow 152. As shown, the inwardly extending flange 176 acts on the flange 180 of the translator 44 connected to the translating member 46 to pull the translating member rearward.

Figure 12:
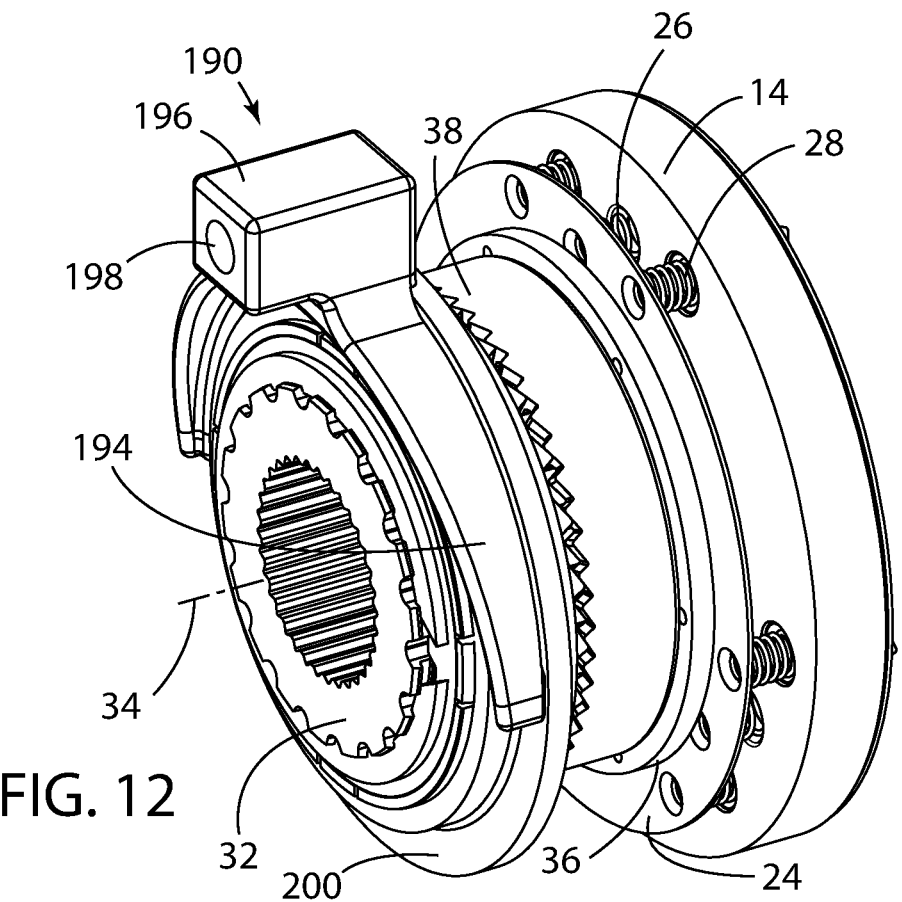
FIG. 12 is a perspective view of another embodiment of an actuation mechanism.
Figure 13:
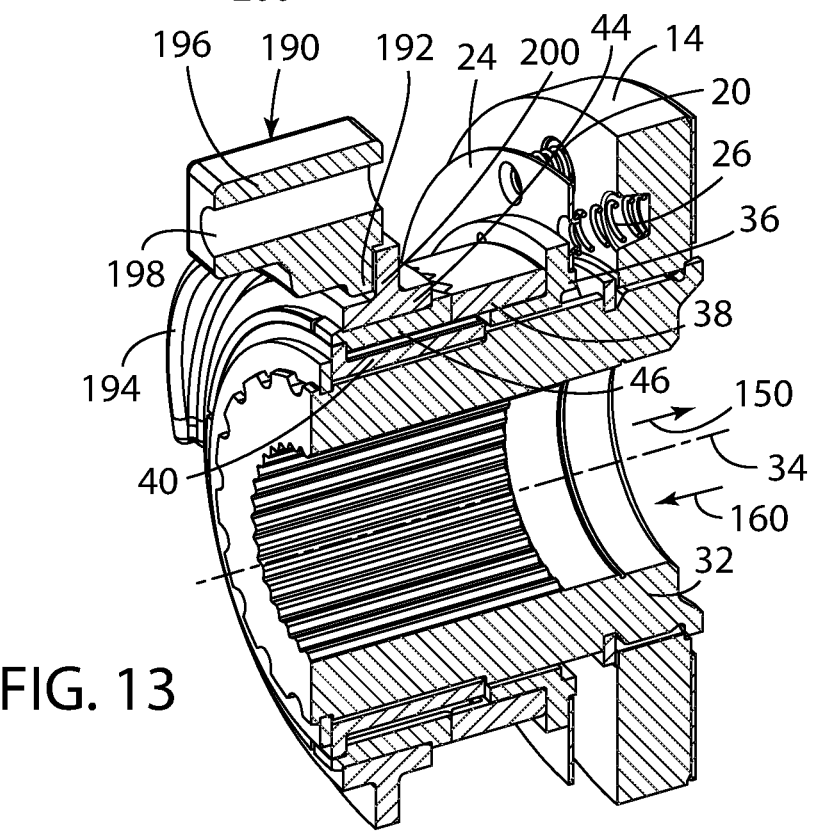
FIG. 13 is a cross-sectional perspective view of the actuation mechanism of FIG. 12.

FIGS. 12 and 13 illustrate an embodiment similar to that in FIGS. 10-11, except the shift fork, is a single-sided shift fork 190. The shift fork 190 includes a single inwardly extending flange member 192 on a C-shaped portion 194. As shown, the flange member 192 is positioned on one side of the flange 200 of the translator 44, connected to the translating member 46, on the side closest to the end 104 of the latch or stop member 40. The double-sided shift fork 190 also includes a connection portion 196 having an aperture or bore 198 sized to receive a member (not shown) that moves the shift fork 190 reciprocally in the direction of the longitudinal axis 34. In this embodiment, the single-sided shift fork 190 operates like the embodiment with the stator 42. The shift fork 190 pushes the translator 44 and translating member 46 axially in the direction of the arrow 150, while the return member or spring 26 moves the translating member 46 axially in the direction of the arrow 160.

Figure 14:
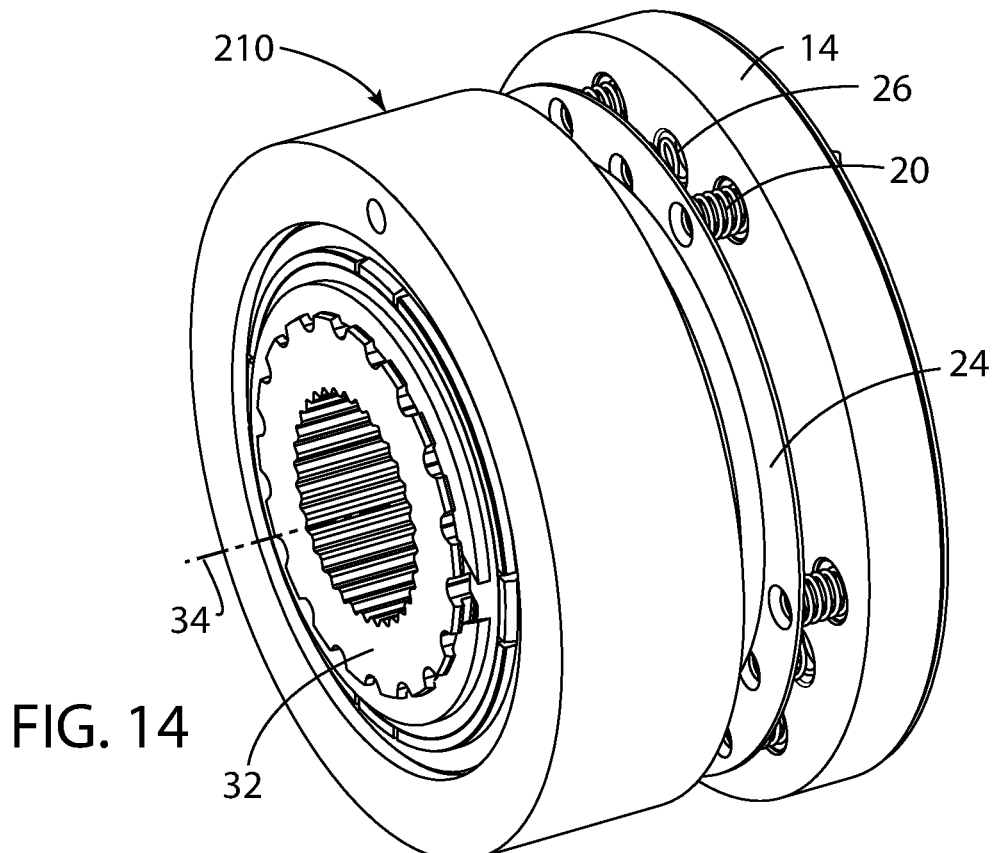
FIG. 14 is a perspective view of a further embodiment of an actuation mechanism.
Figure 15:
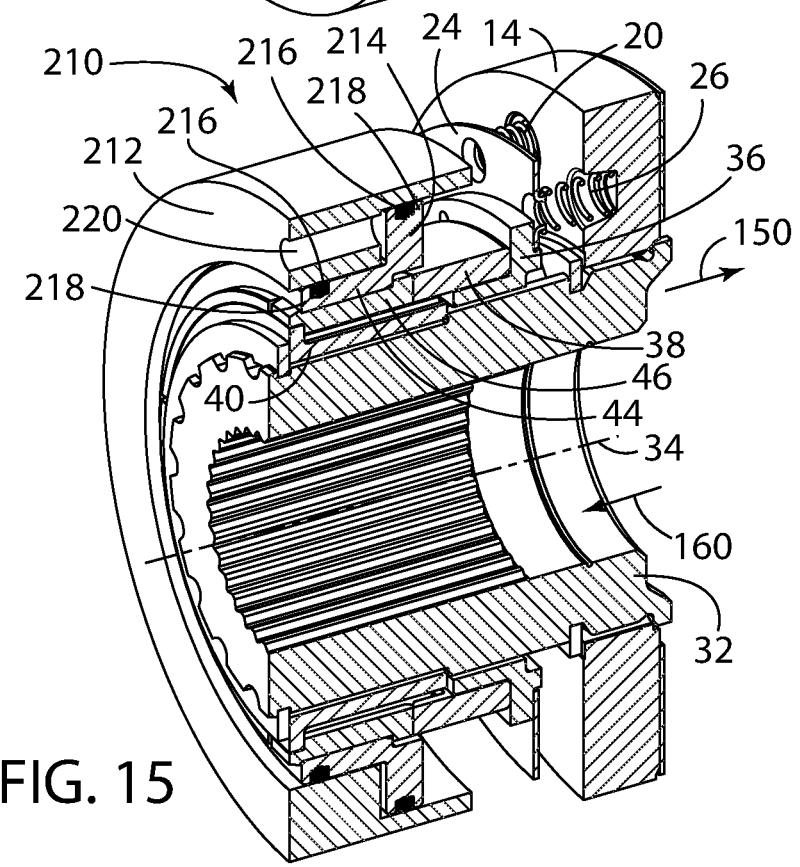
FIG. 15 is a cross-sectional perspective view of the actuation mechanism of FIG. 14.

FIGS. 14 and 15 illustrate a piston 210 used to move the translator 44 and translating member 46. The piston 210 includes a housing 212 and piston 214. The piston 214 is connected to the translator 44. A pair of seal members, illustrated as O-rings 216, in grooves 218, form a seal between the housing 212 and the piston 214. Fluid flowing through the aperture 220 acts on the piston 214, which moves the translator 44 and translating member 46. Like the embodiment with the stator 42, the piston 210 moves the translating member 46 axially in the direction of the arrow 150, while the return member or spring 26 moves the translating member 46 axially in the direction of the arrow 160.

The foregoing mechanisms can be used separately or in combination. For example, the actuation mechanism may include a stator 42 and other mechanisms to move the translating member 46 back and forth. In addition, a multiple-position linear actuator may also control the movement of the translating member 46 in both directions.

Figure 16:
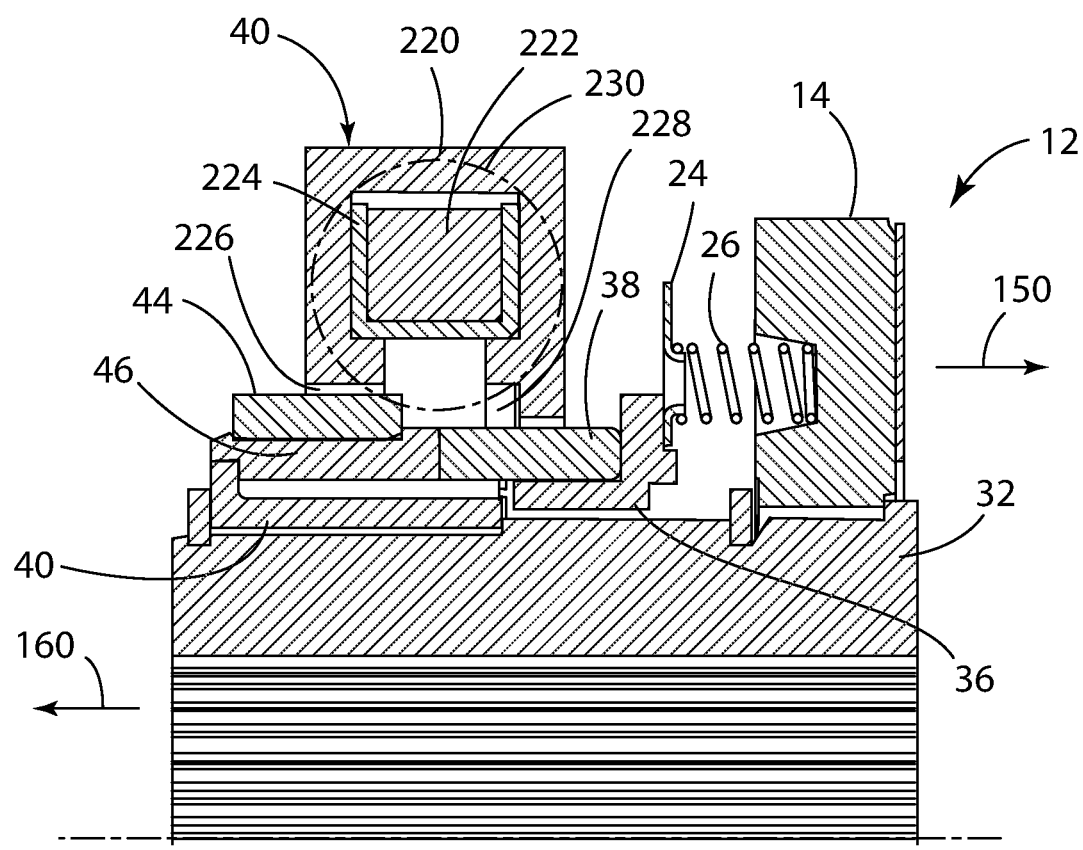
FIG. 16 is a schematic, cross-sectional view of the actuation mechanism for use with a coupling device illustrating stator operation.

FIG. 16 illustrates the stator 42 and translator 44 of the actuation mechanism 10. The stator 42 is stationary and is fixed to the stationary member, for example a transmission case (not shown). The stator 42 having a housing 220 and an electromagnetically inductive coil 222 positioned between adjacent ferromagnetic fingers 224. The electromagnetically inductive coil 222 creates a magnetic flux when energized.

The translator 44, coupled to the translating member 46, is mounted for rotational and axial movement on the hub 32. The translator 44 is radially spaced from the stator 42, with a radial gap 226 and an axial gap 228 between the stator 42 and translator 44. The gaps 226, 228 are sized such that the translator 44 is spaced from and does not contact the stator 42. Both gaps 226, 228 provided for tolerance differences between the respective stator and translator while maintaining a spacing between them. In one example the gap is in the order of point-blank millimeters. The smaller the gap, the less current needed to move the translator 44 and corresponding translating member 46.

The magnetic flux lines 230, flow along closed paths with the majority of lines extending in a circular path across the radial gap 226 between the stator 42 and translator 44. The flow of the flux lines produced by the stator 42 result in a net force on the translator 44. The magnetic flux lines cross the gap 226, 228 wherein the electromagnetically inductive coil 222 and the coil current drives the translator 44 in the direction of the arrow 150.

The electromagnetic source or electromagnetically inductive coil 222 creates an electronically switched magnetic field across the radial and axial gaps 226, 228 that acts on the translator 44 causing translational movement of the translator 44 and corresponding translating member 46 relative to the stator 42 along the longitudinal axis 34 in the direction of the arrow 150.

The stator 42 provides a pulse actuator, wherein energizing, supplying an electrical current to, the electromagnetically inductive coil 222 creates the magnetic field and moves the translator 44. Deenergizing, removing or turning off the electrical current to, the electromagnetically inductive coil 222 removes the magnetic field and correspondingly allows the return spring 26 to act on the indexer 38 and corresponding translator hub 46 moving them rearwardly, in the direction of the arrow 160.

The stator 42 operates as a pulse actuator, the electrical current supplied to the electromagnetically inductive coil 222 may be supplied as a pulse, the duration and degree of which supplied in an amount to move the translator 44, translating hub 46 and indexer 38 to a position wherein the fingers 80 of the indexer 38 clear the grooves 118 of the latch hub 40 as shown in FIG. 7. Once the fingers 80 are clear, the electric current to the electromagnetically inductive coil 222 turned off wherein the return springs 26 act on the indexer 38 moving both the indexer and the translating hub 46 in the direction of the arrow 160.

The stator 42 and translator 44 cooperate to move, pull the translating hub 46 to the right, in the direction of the arrow 150, to both mechanically latch and mechanically unlatch the actuation mechanism 10, and place the coupling device 12 in a deployed and non-deployed position.

Figure 17:
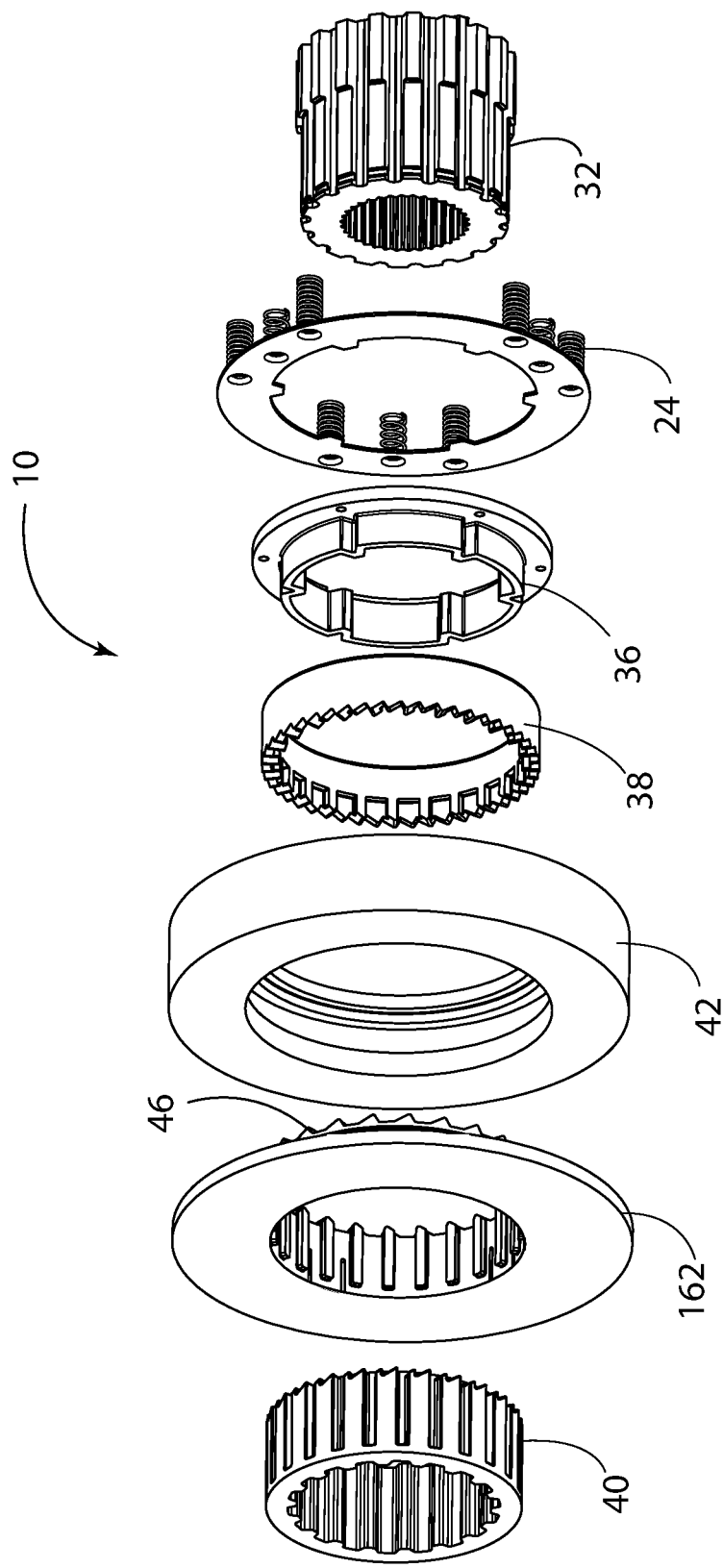
FIG. 17 is a schematic, exploded, partial view of another embodiment of a stator and a translator assembly used with the actuation mechanism.

FIG. 17 illustrates an alternative embodiment of an actuation mechanism 10 having a different stator and translator assembly. Instead of the translator being an annular member, as in the first example, the translator 44 is a radial ring 162 attached to and extending radially outward from the translating member 46.

Figure 18:
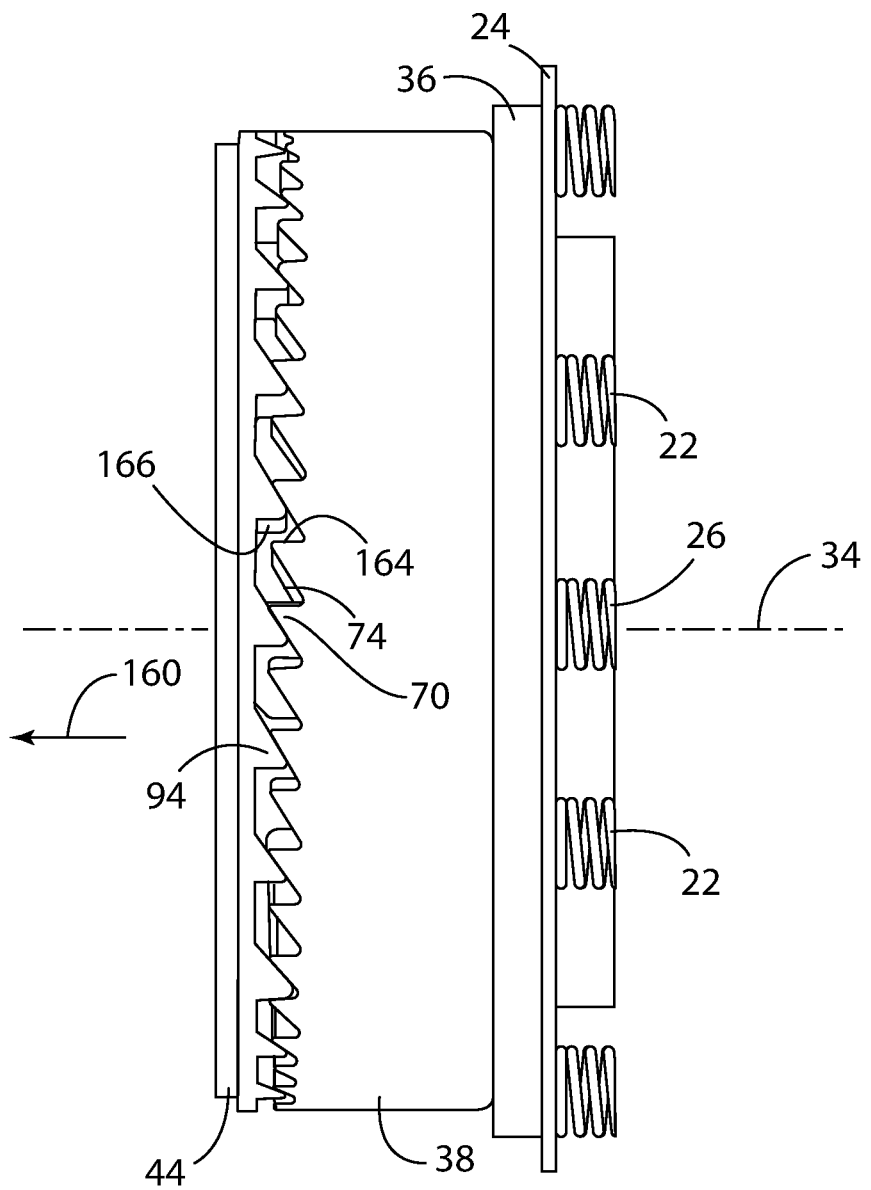
FIG. 18 is a schematic, partial side view of another embodiment of an actuation mechanism for use with a coupling device.

FIG. 18 illustrates another example of an actuation mechanism 10 wherein the cam displacement surface 164 of the indexer 38 and cam displacement surface 166 of the translating member 46 extend axially, parallel to the longitudinal axis 34 of the hub 32. Because the cam displacement surfaces 164, 166 are not angled but extend parallel to the longitudinal axis 34 of the hub 32, engagement of the respective cam displacement surfaces 164, 166 prevents rotation of the indexer 38. This example requires an actuator that exerts a force that pulls the translating member 46 rearward or back, in the direction of the arrow 160, to disengage the translating member 46 and indexer 38. For example, the double-sided shift fork 170 would operate to both push and pull the translator 44 and translating member 46.

The actuation mechanism 10 provides a two-position latch, a first, retracted position, and a second, extended position. In the first, retracted position the second or inner set of cam members 82 of the indexer 38 are in grooves or guides 118 of the latch or stop member 40. In one example, the second or inner set of cam members 82 engage a second or inner set of cam members 136 of the translating member 46. In the second position, the second or inner set of cam members 82 engage the cam members 126 of the latch or stop member 40. In the first and second positions, the latch or stop member 40 provides positive support; i.e., force applied to the indexer 38 in the direction of the arrow 160 is supported by the latch or stop member 40. The latch or stop member 40 provides a fixed, hard stop or hard lock limiting axial movement of the indexer 38.

While examples or exemplary embodiments are described above, it is not intended these embodiments describe all possible forms of the present invention. The words used in the specification are words of description rather than limitation. It is understood that various changes may be made without departing from the spirit and scope of the present invention. Additionally, the features of various implementing embodiments may be combined to form further embodiments of the present invention.

The description of the invention is merely exemplary; thus, variations that do not depart from the gist of the invention are intended to be within the scope of the invention. Such variations are not to be regarded as a departure from the spirit and scope of the invention.

What is claimed is:

1. An assembly comprising:
a hub, the hub including a shaft;
a first member secured to the hub and constrained against rotational and axial movement with respect to the hub, the first member having a side surface extending between an inner and an outer circumferential surface of the first member, the side surface of the first member including a cam surface;
a second member rotatably fixed and axially movable with respect to the first member, the second member having a side surface extending between an inner and an outer circumferential surface of the second member, the side surface of the second member including a cam surface;
a third member rotatably and axially movable with respect to the shaft, the third member having a side surface extending between an inner circumferential surface and an outer circumferential surface, the side surface of the third member including a first cam surface and a second cam surface extending at a same angle, the second cam surface of the third member radially inward of the first cam surface of the third member, the third member having a groove in the inner circumferential surface of the third member; and
the cam surface of the first member is in the groove of the third member when the assembly is placed in a retracted position, and the cam surface of the first member contacts the second cam surface of the third member when the assembly is placed in an extended position.

2. The assembly of claim 1 including:
the second cam surface of the third member is in a groove of the first member when the assembly is placed in the retracted position.

3. The assembly of claim 1 including:
the third member engages a drive member; and
the drive member engages a locking element.

4. The assembly of claim 1 including:
the third member is supported by the first member in both the retracted position and the extended position.

5. The assembly of claim 1 including:
a coupling member having a face and a at least one pocket communicating with the face;
a locking element disposed in the pocket; and
the locking element extends from the pocket and above the face when the locking element is in a deployed position, and the locking element remains within the pocket and below the face when the locking element is in a non-deployed position.

6. The assembly of claim 1 wherein:
the first member is constrained against rotational and axial movement with respect to the hub.

7. The assembly of claim 1 including:
a translator carried on the second member.

8. The assembly of claim 1 including:
a carrier carried on the hub, the carrier including a cylindrical body and a radially outwardly extending flange; and
the third member carried on the cylindrical body of the carrier.

9. The assembly of claim 1 wherein:
the first cam surface and the second cam surface of the third member extending to an end of the third member.

10. The assembly of claim 1 including:
the second member having a second cam face, the second cam face engaging the second cam face of the third member.

11. An assembly comprising:
a first member having a cylindrically shaped body, a cam face and an end face opposite the cam face, the first member including a plurality of projections and grooves on an outer circumferential surface of the first member;
a second member having a cylindrically shaped body, a cam face and a plurality of projections and grooves on an inner circumferential surface of the second member, the projections and grooves on the inner circumferential surface of the second member complementary to the projections and grooves on the outer circumferential surface of the first member wherein engagement of the projections and grooves on the outer circumferential surface of the first member with the projections and grooves on the inner circumferential surface of the second member allows axial movement and prevents rotational movement between the first member in the second member;
the cam face of the second member spaced radially from and concentric with the cam face of the first member;
a third member having a cylindrically shaped body, a cam face and a plurality of projections and grooves on an inner circumferential surface of the third member, the cam face of the third member including a first cam face and a second cam face, the first and second cam faces have a common border; and
the first cam face of the third member engages the cam face of the second member, and the second cam face of the third member engages the cam face of the first member.

12. The assembly of claim 11 including:
a coupling member having a face and at least one pocket communicating with the face;
a locking element disposed in the pocket;
a carrier, the carrier engaging the third member, the carrier is rotatably fixed and axially movable for axial motion with no rotation; and
a drive member, the drive member between the carrier and the locking element wherein the locking element extends from the pocket and above the face when the locking element is in a deployed position, and the locking element remains within the pocket and below the face when the locking element is in a non-deployed position.

13. The assembly of claim 11 including:
the second member having a second cam face, the second cam face engaging the second cam face of the third member.

14. The assembly of claim 11 including:
the first cam face and the second cam face of the third member extending to an end of the third member.

15. An assembly comprising:
a hub, the hub including a shaft rotating about a longitudinal axis;
a first member secured to the hub and constrained against rotational and axial movement with respect to the hub, the first member having a side surface extending between an inner and an outer circumferential surface of the first member, the side surface of the first member including a cam member;
a second member rotatably fixed and axially movable with respect to the first member, the second member having a side surface extending between an inner and an outer circumferential surface of the second member, the side surface of the second member including a cam member;
a carrier carried on the hub, the carrier having a cylindrical body and a radially outwardly extending flange;
a third member positioned over the cylindrical body and rotating around the cylindrical body, the third member rotatably and axially movable with respect to the shaft, the third member having a side surface extending between an inner circumferential surface and an outer circumferential surface, the side surface of the third member including a first cam member and a second cam member, the second cam member of the third member radially inward of the first cam member of the third member, and the third member having a groove in the inner circumferential surface of the third member; and
the cam member of the first member is in the groove of the third member when the assembly is placed in a retracted position, and the cam member of the first member contacts the second cam member of the third member when the assembly is placed in an extended position.

16. The assembly of claim 15 including:
the second cam member of the third member having a cam ramp sloped with respect to the longitudinal axis of the hub; and
a cam displacement surface extending parallel to the longitudinal axis.

17. The assembly of claim 15 including:
the second member having a second cam member, the second cam member of the second member engaging the second cam member of the third member.

18. The assembly of claim 17 including:
the second cam member of the second member having a cam ramp that extends at the same angle and in common with a cam ramp of the first cam member of the second cam member.

19. The assembly of claim 15 including:
the second cam member of the third member having a cam ramp that extends at the same angle and in common with a cam ramp of the first cam member of the third member.

* * * * *